April 12, 1938.                A. H. LANG                2,113,697
                           ELECTRIC TOASTER
                          Filed June 1, 1937
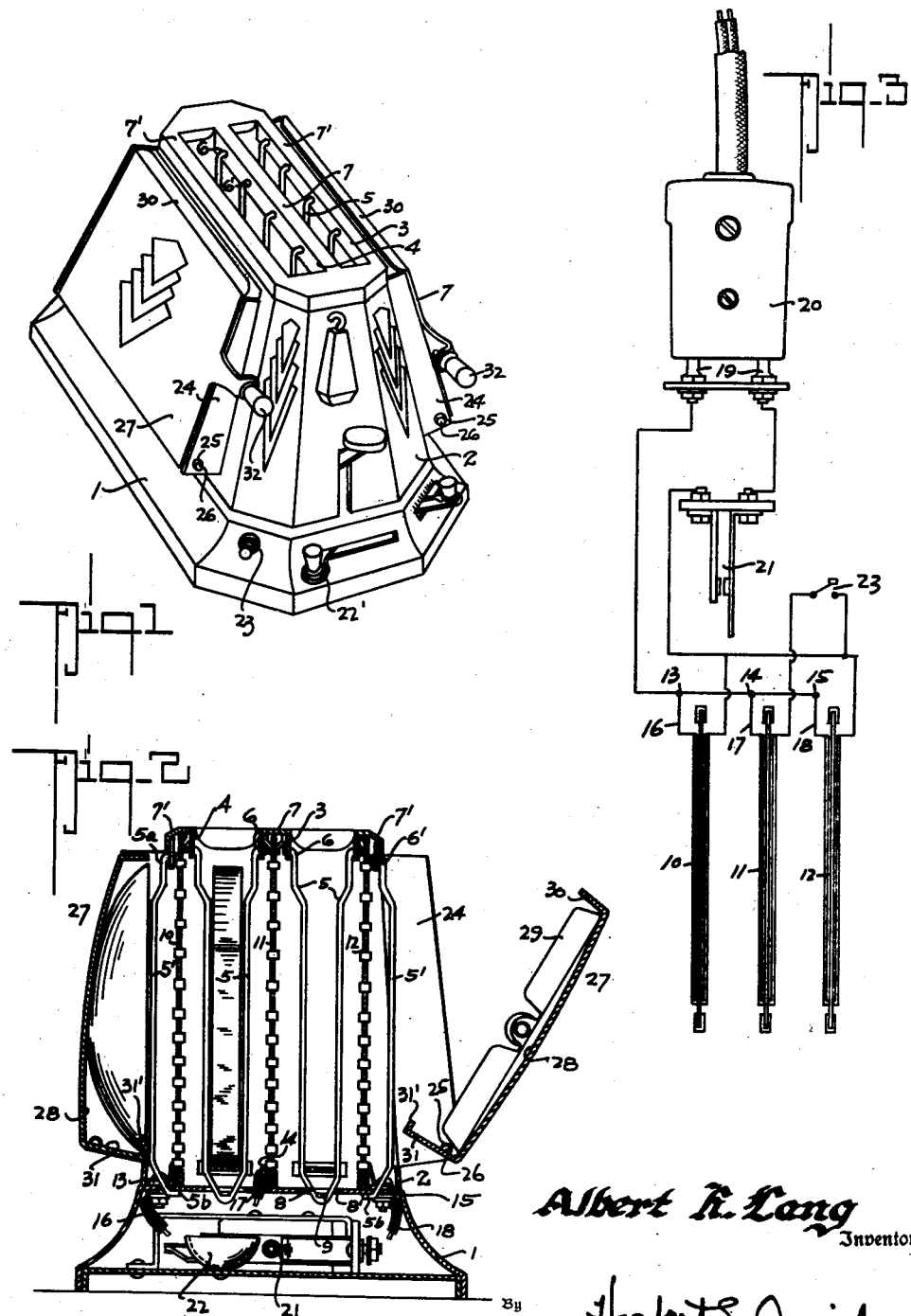
Albert H. Lang
Inventor
Herbert E. Smith
Attorney Patented Apr. 12, 1938

2,113,697

UNITED STATES PATENT OFFICE 2,113,697

ELECTRIC TOASTER

Albert Henry Lang, Spokane, Wash.

Application June 1, 1937, Serial No. 145,658

1 Claim. (Cl. 219—19)

My present invention relates to improvements in electric toasters and more particularly to such a device that is capable of toasting the opposite sides of two or more slices of bread, and in addition, simultaneously toasting the single inner faces of a cut roll, bun, the crusted ends of a loaf of bread, or other similar article having exterior crusted faces.

In the utilization of my invention I provide a toaster which may be employed in the usual manner to toast slices of bread, and which is also capable of alternately, or of simultaneously, toasting single faces of cut rolls or buns, which due to the structure of such articles are not adapted for entrance in the usual slots provided in the ordinary toaster.

My invention consists primarily in the addition to the usual type of toaster having two or more slots for slices of bread, of a compartment on either side of the toaster fashioned by the use of hinged doors, and the cut rolls or buns when properly inserted in the compartments present their cut or inner faces to the heating element. In this arrangement the cut faces of rolls, buns, or the ends of a loaf of bread are in position for toasting without affecting the exterior crusted faces of these articles, and the toasted portions are also readily accessible and subjected to the same treatment as the slices that are toasted on both sides at the same time.

As will hereinafter be more fully described, I also employ the conventional heating elements, which usually are utilized to toast slices of bread, without the necessity for the additional heating elements, and it will therefore be readily seen that my device realizes a more efficient use of the heating elements and at the same time the utilization of my invention in the toaster, substantially decreases the loss by wasted heat.

The usual toaster is intended solely for the toasting of sliced bread and the slices are usually dropped into the slots in the toaster for the purpose of toasting the opposite sides simultaneously in order to shorten the toasting period. Such toasters are usually equipped with an automatic signal or electric switch, which may be set for any desired time limit or interval, by means of a suitable lever, whereby the electric current is cut off at the required time, and then the toasted slice or slices are ejected from the slots or holders for ready access. Such a device using two slots or holders requires three heating elements, one of which serves to toast the adjoining faces of two slices while the other two toast the remote or outer faces of the two slices of bread.

In my invention I employ the two outer heating-elements for toasting the outer or remote faces of two slices of bread, and in addition, I utilize these same elements, simultaneously if desired, to toast the inner or cut faces of a roll, bun, or the ends of a loaf of bread. These half-rolls, half-buns, or loaf ends, are conveniently toasted while occupying compartments at opposite sides of the toasting device exterior of the outer heating elements. In some instances the intermediate heating element may be dispensed with and I have therefore provided means whereby the central or intermediate element may be cut out when only single faces are to be toasted.

The invention consists in certain novel combinations and arrangements of parts as will hereinafter be more fully set forth and claimed. In the accompanying drawing I have illustrated one complete example of the physical embodiment of my invention wherein the parts are combined and arranged according to one mode I have devised for the practical application of the principles of my invention. It will be understood that changes and alterations may be made in this exemplifying drawing, within the scope of my claim without departing from the principles of the invention.

Figure 1 is a front perspective view of an electric toaster in which my invention is embodied.

Figure 2 is a transverse, vertical sectional view of the toaster, with one of the doors or hinged side walls opened, a half-roll being enclosed by the other door, and a usual slice of bread being shown in one of the holders.

Figure 3 is an expanded and diagrammatic view showing some of the structure of the toaster and also showing the electrical circuit, switches, and heating elements.

In the assembly view, particularly Figure 1, I employ a suitable hollow base 1, and body or housing 2 fashioned in well known manner and of somewhat pyramidal shape, and the housing is fashioned with two spaced slots 3 and 4 opening through the top wall of the toaster for insertion and removal of the slices of bread to be toasted.

The inserted slices are retained within the housing in holders comprising posts 5 forming vertically arranged grids of substantially U-shape, and at 6 the upper ends of these grids or holders are attached in suitable manner to a central horizontal longitudinally extending supporting bar 7 of the housing. The upper outer ends 6' of the grids forming the holders are secured to the outer edge bars 7' of the top of the housing. The lower bent ends 8 of the U-shaped holders or guards 5 fit into and project through recesses or slots 8' in the top wall of the base 1 of the housing, and they are secured in position by means of retaining rods or wires 9 beneath the top wall and passing successively through the bends of the holders as they project down through the slots. These guards or holders 5 form open grills which prevent the slices of bread from coming in contact with the heating elements, and at the same time they permit passage and circulation of heated air currents within the toaster housing.

I also provide vertical guards or posts 5' exterior of the two holders or grids 5 and adjacent the opposite sides of the housing, which posts or grids are secured at their upper ends to the top edge bars 7' of the housing as indicated at 5a while their lower ends are secured at 5b to the top wall of the base 1 of the housing.

As seen in Figures 2 and 3 the heating elements are made up of the usual coiled, or flat, resistances as 10, 11 and 12, the two outer elements 10 and 12 being located exterior of the two slice-holders or grids, and the central heating element is positioned under the central longitudinal supporting bar 7 of the housing between the two slice-holders or grids. The three heating elements are electrically connected at 13, 14, and 15 to the respective wires 16, 17, and 18, which wires in turn, provide electrical connection with a standard plug and socket connector 19 and 20.

For controlling the activity of the heating elements, I utilize a standard time control or thermostat 21 and the usual signal or announcer 22. The thermostat may be set, as indicated, for any desired time-period of operation, and the circuit is automatically broken at supply switch 22' Fig. 1, when the thermostat opens under influence of the heat passing therethrough due to the resistance of the toasting coils or heating elements.

I also provide a cut out switch as 23 in the heating circuit of the intermediate or central heating element 11, in order that this element, under manual control, may be cut out when it is desired, without affecting the heating elements 10 and 12, as for instance when the two slice holders are not to be used, and half buns or half rolls are to be toasted only on their cut sides by means of the outer elements 10 and 12.

Referring to Figure 2, for the utilization of my improved toaster in toasting the single cut faces of half-buns or half-rolls, or the ends of a loaf of bread, I provide lateral compartments at opposite sides of the housing adjacent to and exterior of the heating elements 10 and 12. The opposite sides of the housing are fashioned with spaced, upright, laterally projecting flanges 24 and these flanges in pairs are provided with alined bearing holes 25 located at or near their lower ends. Mounted on hinge pins 26 that are journaled in the bearing holes are two oppositely opening hinged doors 27, each of which forms a receptacle in conjunction with the pairs of flanges 24, for the half-rolls or half-buns. Each of the doors is fashioned with a concavo-convex wall 28 and inturned flanges 29 that fit in closely within the complementary flanges 24 of the housing when the doors are closed. The upper horizontal edge of each door is also provided with an inturned flange 30, and the lower edge with a wider flange 31, the former to act as a stop for the closed door and the latter to perform the functions of a shelf for the support of the half-bun or roll.

At its inner edge the shelf 31 is fashioned with a suitable number of upturned lugs 31' which engage the lower edge of the half-roll to prevent displacement from its holder or receptacle. In order that the half-roll will not be displaced, but will move with and follow the movement of the hinged door, the hinge pins 25, it will be noted, are located adjacent the lower outer edge of the door or of the shelf 31, and the retaining lugs 29 are of less depth than the shelf, and therefore the door in closed position tends to lean inwardly of the toaster. When the door is opened the half-roll therefore is prevented from slipping off the shelf, and due to the location of its center of gravity, the half-roll will follow the door in its movements.

Handles as 32 are conveniently on exterior extensions 33 of the retaining flanges 29 of the doors so that the doors may be swung open on their hinges for the removal of the toasted articles.

The half-rolls or half-buns are first placed in the doors or receptacles 27 with the cut faces inwardly and when the doors are swung to closed position the cut-faces are lightly pressed against the guards 5' in position to receive heat from the heating elements 10 and 12. Simultaneously, slices of bread may be inserted in their holders through slots 3 and 4, and the exposed faces of these slices receive heat also from the heating elements 10—11 and 11—12.

Thus I have provided for the additional toasting of the cut faces of half-rolls or half-buns, or loaf-ends, without increasing the amount of heat or, electrical energy usually employed for the slices of bread, inasmuch as the heating elements 10 and 12 are always employed to toast the slices of bread.

Furthermore any waste of heat or current from the central heating element 11 is eliminated or obviated through the provision of the cut out switch 23, by means of which the current is cut out or cut off in this circuit when it is desired to toast half-rolls or half-buns only in the doors or receptacles 27 by the use of the heating elements 10 and 12.

It will be apparent that the improved toaster of my invention will operate in the usual manner to simultaneously toast two slices of bread on both sides; four slices of bread on one side only; or the two halves of a bun or roll each on one side only, that is, on the sliced side.

Having thus fully described my invention, what I claim as new and desire to secure by Letters Patent is:—

In an electric toaster, the combination with a base, a housing having three supporting bars forming spaced top-openings, a pair of spaced U-shaped holders suspended in said bars beneath said openings and said holders having bottom bends passing through slots in the base, and retaining pins passed through said bends, of a pair of heating units exterior of the holders, an intermediate unit, means for supporting said units from the supporting bars, and a pair of laterally swinging hinged doors forming receptacles exterior of the first mentioned pair of heating units.

ALBERT HENRY LANG.